July 10, 1923.

P. N. ANDRESEN ET AL 1,461,341

DIRIGIBLE HEADLIGHT

Filed April 5, 1922

Peter N. Andresen and
Phillip J. Jeffway,
Inventor

By Howard A. Coombs
Attorney

Patented July 10, 1923.

1,461,341

UNITED STATES PATENT OFFICE.

PETER N. ANDRESEN AND PHILLIP J. JEFFWAY, OF SALEM, OREGON.

DIRIGIBLE HEADLIGHT.

Application filed April 5, 1922. Serial No. 549,721.

*To all whom it may concern:*

Be it known that we, PETER N. ANDRESEN, a citizen of the United States, and PHILLIP J. JEFFWAY, a subject of Great Britain, residing at Salem, in the county of Marion and State of Oregon, have invented new and useful Improvements in Dirigible Headlights, of which the following is a specification.

This invention relates to a tilting light support for automobile headlights and its object is to provide an improved construction of this nature arranged in such manner as to receive and support headlights of varying sizes in such manner that the headlights may be tilted, under the control of the driver and from the driver's seat, to direct the light rays downwardly when passing other vehicles.

It is a further object of the invention to provide a structure of the character indicated which will be free of objectionable rattling and one wherein the supporting elements of the light serves to rigidly tie the two front fenders together and to hold them against objectionable vibration.

Further objects and advantages of the invention will be set forth in the detailed description which follows.

In the accompanying drawing.

Like numerals designate corresponding parts throughout the several figures of the drawing.

Figure 1:
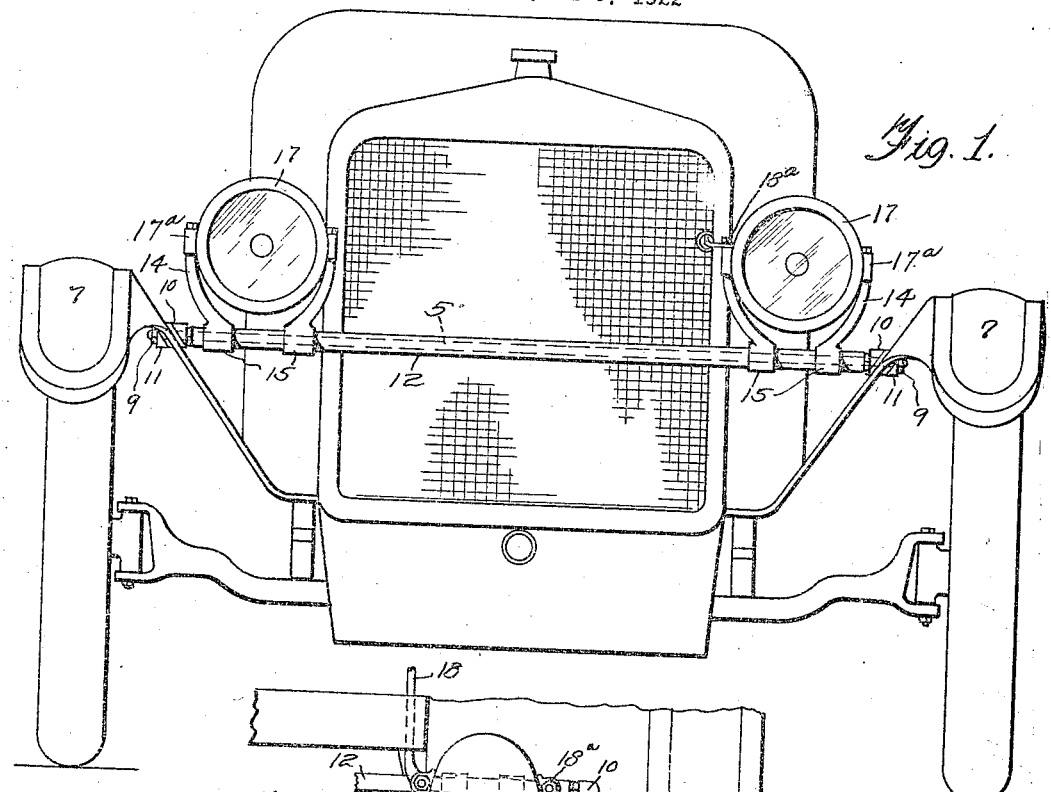
Fig. 1 is a front elevation of an automobile having the invention applied thereto.
Figure 2:
Fig. 2 is a partial plan view illustrating one of the lights.
Figure 3:
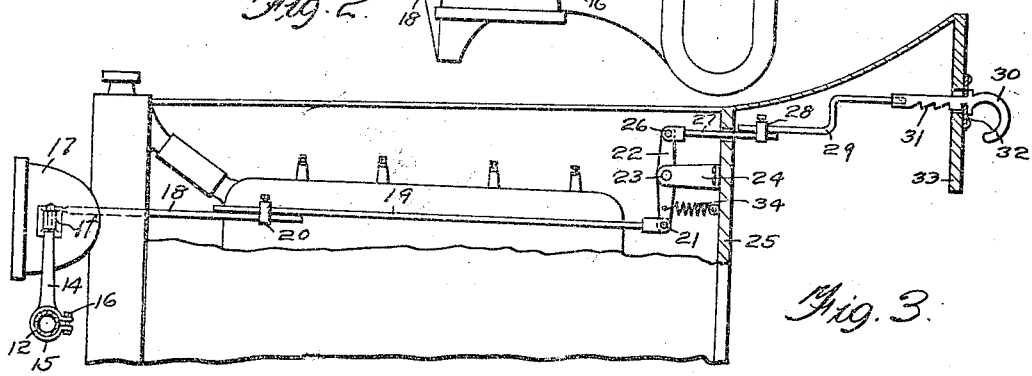
Fig. 3 is a view partly in side elevation and partly in section of the hood and dash of an automobile showing the invention applied thereto.
Figure 4:
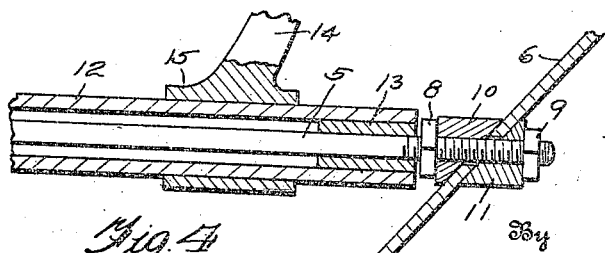
Fig. 4 is a detail sectional view illustrating the manner of mounting the supporting sleeve hereinafter described.

The apparatus constituting the particular embodiment of the invention which we have chosen for purposes of illustration, consists of a rod 5 which extends between and passes through the inclined aprons 6 of the front fenders 7 of an automobile. Nuts 8 and 9 and washers 10 and 11 bind this rod rigidly between the aprons 6. Thus the rod is not only firmly supported but the two aprons and fenders are braced with respect to each other and are thereby held against objectionable vibration. A sleeve 12 is bushed at its ends, as indicated at 13, and is mounted to turn on the rod 5. Arms 14, constituting the lamp supporting brackets, are provided with hub portions 15 which encircle the sleeve 12, said hub portions being split and being bound in adjusted position along said sleeve by nuts and bolts 16. Thus, by adjusting the arms 14 of a pair toward or from each other along the sleeve 12, lamps of varying sizes may be received and supported, it being understood that the upper ends of the arms pass through ears 17ª of the lamp 17. To impart turning movement to the sleeve 12 with respect to the rod 5 to thereby tilt the lamp downwardly when passing another vehicle, a rod 18 is engaged with the upper end of one of the arms 14 and is secured in place by the usual lamp retaining nuts 18ª. This rod passes through the radiator, or the shell and is adjustably bound to a rod 19 by means of a clamp 20. The rear end of the rod 19 is pivoted at 21 to the lower end of a lever 22. The lever 22 is pivoted at 23 to a bracket 24 that is supported from the dash 25. The upper end of the lever 22 is pivotally connected at 26 to a rod 27 and the rear end of this rod is adjustably connected by a clamp 28 with a rod 29. The rear end of the rod 29 is provided with an operating handle or fingerpiece 30 having a notched portion 31, which is adapted to engage with a keeper-plate 32 mounted upon the instrument board 33. A spring 34 tends to draw the lower end of the lever 22 rearwardly and thus draw the handle 30 inwardly to its limited movement. When in this position the lamps are in "normal" position. In other words, they are in a position to direct the light rays to a point ahead of the automobile best suited for ordinary driving. When approaching another vehicle, the driver may, by drawing rearwardly upon the handle 30, tilt the lamps downwardly through the connections described and thus prevent the glare from the lamps from interfering with the vision of a driver approaching from the opposite direction.

The several adjustments provided by the clamps 20 and 28 adapt the apparatus to be placed upon the market as an accessory and as an article of manufacture, since by reason of these adjustments it may be made to fit practically any standard make of automobile.

It is to be understood that the invention is not limited to the precise construction set forth but that it includes within its purview whatever changes fairly come within either the terms or the spirit of the appended claims.

Having described our invention what we claim is:

1. An automobile headlight supporting and tilting mechanism, comprising a rod and means to secure it between the front fenders of the automobile, a sleeve rotatably mounted on said rod, lamp-supporting brackets adjustably mounted on said sleeve, an adjustable rod connected to one of said brackets, a lever adapted to be centrally pivoted on the dash-board of the automobile, said adjustable rod being connected to the lower end of said lever, manually operable means connected to the upper end of said lever, and a spring tending to swing said lever so as to elevate the focal axes of the lamps.

2. An automobile headlight supporting and tilting mechanism, comprising a rod and means to secure it between the front fenders of the automobile, a sleeve rotatably mounted on said rod, lamp-supporting brackets adjustably mounted on and projecting upwardly from said sleeve, manually operable means connected to the upper end of one of said brackets, means to adjust the length of the said connection, a spring tending to pull on said connection, and detachable means to prevent movement of said connection by said spring.

In testimony whereof we have hereunto set our hands.

PETER N. ANDRESEN.
PHILLIP J. JEFFWAY.